(12) United States Patent
Aikin et al.

(10) Patent No.: US 10,518,674 B1
(45) Date of Patent: Dec. 31, 2019

(54) PASSIVE SAFETY SYSTEM FOR OCCUPANT DECELERATION

(71) Applicants: Randol W. Aikin, San Francisco, CA (US); Malcolm J. Northcott, Sunnyvale, CA (US)

(72) Inventors: Randol W. Aikin, San Francisco, CA (US); Malcolm J. Northcott, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 81 days.

(21) Appl. No.: 15/268,923

(22) Filed: Sep. 19, 2016

Related U.S. Application Data

(60) Provisional application No. 62/233,711, filed on Sep. 28, 2015.

(51) Int. Cl.
| | |
|---|---|
| *B60N 2/427* | (2006.01) |
| *B60N 2/02* | (2006.01) |
| *B60N 2/08* | (2006.01) |
| *B60R 21/0132* | (2006.01) |
| *B60N 2/42* | (2006.01) |

(52) U.S. Cl.
CPC ......... *B60N 2/4279* (2013.01); *B60N 2/0276* (2013.01); *B60N 2/08* (2013.01); *B60N 2/42* (2013.01); *B60N 2/4207* (2013.01); *B60N 2/42736* (2013.01); *B60R 21/0132* (2013.01); *B60N 2002/0268* (2013.01)

(58) Field of Classification Search
CPC .......................................... B60N 2/42–2/4279
See application file for complete search history.

(56) References Cited

U.S. PATENT DOCUMENTS

| | | | |
|---|---|---|---|
| 5,167,421 A | 12/1992 | Yunzhao | |
| 5,244,252 A * | 9/1993 | Serber | A47C 3/0255 297/216.19 |
| 6,634,669 B2 * | 10/2003 | Levine | B60K 23/02 280/735 |
| 9,327,624 B1 * | 5/2016 | Alsaif | B60N 2/42736 |
| 2002/0145315 A1 * | 10/2002 | Fraley | B60N 2/4214 297/216.13 |
| 2004/0113452 A1 | 6/2004 | Liu | |

(Continued)

FOREIGN PATENT DOCUMENTS

| | | | | |
|---|---|---|---|---|
| JP | 2006143173 A | * | 6/2006 | ........... B60N 2/4235 |
| JP | 04701796 B2 | | 6/2011 | |

(Continued)

OTHER PUBLICATIONS

Translation of JP2006143173A obtained via ESPACENET on May 1, 2019 (Year: 2006).*

(Continued)

*Primary Examiner* — Jeffrey C Boomer
(74) *Attorney, Agent, or Firm* — Young Basile Hanlon & MacFarlane, P.C.

(57) ABSTRACT

A passive safety system includes a seat support structure, a seat that is connected to the seat support structure, a motion control device operable to control motion of the seat relative to the seat support structure, a sensor that provides an output signal, and a controller. The output signal is indicative of an imminent collision. The controller causes the motion control device to move the seat relative to the seat support structure in response to the output signal.

17 Claims, 5 Drawing Sheets

(56) References Cited

U.S. PATENT DOCUMENTS

| | | | |
|---|---|---|---|
| 2005/0035634 A1* | 2/2005 | Duber | B60N 2/062 297/216.1 |
| 2005/0240329 A1* | 10/2005 | Hirota | B60N 2/42736 701/41 |
| 2006/0055214 A1* | 3/2006 | Serber | B60N 2/0745 297/216.1 |
| 2008/0162002 A1* | 7/2008 | Bacher | B60N 2/0232 701/45 |
| 2010/0036565 A1* | 2/2010 | Bernzen | B60R 21/013 701/45 |
| 2011/0031055 A1* | 2/2011 | Rajasingham | B60N 2/4235 180/271 |
| 2014/0084656 A1* | 3/2014 | Hozumi | B60N 2/0244 297/344.1 |
| 2014/0358378 A1* | 12/2014 | Howard | B60N 2/501 701/45 |
| 2017/0015272 A1* | 1/2017 | Ohno | B60R 21/23138 |

FOREIGN PATENT DOCUMENTS

| | | | |
|---|---|---|---|
| KR | 20040043844 A * | 5/2004 | |
| WO | 2000012350 A1 | 3/2000 | |
| WO | 2011039789 A1 | 4/2011 | |

OTHER PUBLICATIONS

Translation of KR20040043844 obtained via ESPACENET on May 1, 2019 (Year: 2004).*

* cited by examiner

PASSIVE SAFETY SYSTEM FOR OCCUPANT DECELERATION

CROSS-REFERENCE TO RELATED APPLICATIONS

This application claims the benefit of U.S. Provisional Patent Application No. 62/233,711, which was filed on Sep. 28, 2015.

FIELD

The application relates generally to passive safety systems.

BACKGROUND

Common passive safety systems used to protect occupants in a front-end collision include airbags packaged within the steering wheel and dashboard of a vehicle. During a front-end collision, the rate of deceleration of the vehicle is quite rapid. Conventional airbags deploy when the collision is detected by one or more sensors. For example, the collision may be detected when a crumple zone along the front frame of the vehicle has been compressed by approximately half of its overall length.

Since airbags are generally not deployed until the occupants within the vehicle have moved a significant distance toward the steering wheel or dashboard, the airbags have only a small time window to exert sufficient force to decelerate the occupants. The extremely fast deployment time and high force requirements of airbags that may result in airbag-related injuries to the arms, head, and neck.

Pre-collision sensors may be used to deploying airbags prior to an imminent collision, allowing more time to decelerate occupants, which reduces the overall deployment force for the airbags. However, deployment is irreversible and undesirable when the collision does not occur or occurs in a manner that is different than anticipated by the pre-collision sensors. Further, airbags can only be used with occupants meeting certain height or weight thresholds (e.g., adults).

SUMMARY

One aspect of the disclosed embodiments is a passive safety system that includes a seat support structure, a seat that is connected to the seat support structure, a motion control device operable to control motion of the seat relative to the seat support structure, a sensor that provides an output signal, and a controller. The output signal is indicative of an imminent collision. The controller causes the motion control device to move the seat relative to the seat support structure in response to the output signal.

Another aspect of the disclosed embodiments is a passive safety system that includes a seat, and a structure for supporting the seat, wherein the seat is movable with respect to the structure. A motion control device is connected to the structure. The motion control device is operable to apply a force to the seat. A sensor provides an output signal, wherein the output signal indicates a vehicle deceleration. A controller controls the force applied to the seat by the motion control device based on the vehicle deceleration.

Another aspect of the disclosed embodiments is a passive safety system that includes a seat support structure, a seat that is connected to the seat support structure, a damper that controls motion of the seat relative to the seat support structure, a release mechanism, and a controller. The release mechanism is movable between a between a locked position, in which the release mechanism restrains motion of the seat relative to the seat support structure, and an unlocked position, in which the release mechanism permits motion of the seat relative to the seat support structure. The controller causes movement of the release mechanism between the locked position and the unlocked position.

DETAILED DESCRIPTION

The following disclosure relates to a passive safety system that can be used to reduce force imparted by an airbag to an occupant during a collision by better controlling an occupant's deceleration. This can be accomplished by using motion control devices to control the rate of deceleration of an occupant within a vehicle seat both before and during a collision, giving the airbag more time to deploy at an optimum occupant position. The deceleration of the occupant also reduces the force requirement of the airbag, as the airbag can be designed to provide a lower level of deceleration given its operation in conjunction with the motion control devices. Additionally, if the seat is allowed to move with the occupant, the force exerted by the seat restraint (e.g., the seatbelt) will likewise be reduced, even in the absence of airbag use (e.g., for children).

The passive safety system for passenger vehicles described herein can also adjust the position of an occupant with respect to a vehicle structure, such as a steering wheel or dashboard, prior to a collision in order to better control the occupant's rate of deceleration and thus the force exerted by safety restraints and airbags during the collision. This may be accomplished by designing vehicle seats that are translatable within seat support structures such as seat rails that are configured to undergo changed motion along the seat support structures prior to and during the collision.

The described passive safety systems are also relevant to autonomous vehicles. For example, during periods of autonomous operation, the distance between the driver and steering wheel can be increased. This allows for an even larger throw of the seat (and more deceleration of the driver) in the event of a collision. Further, in the case where the seat includes a swivel design, the orientation of the seat in relation to the impending collision can be modified to optimize the effect of airbags and seat restraints during the collision.

Figure 1:
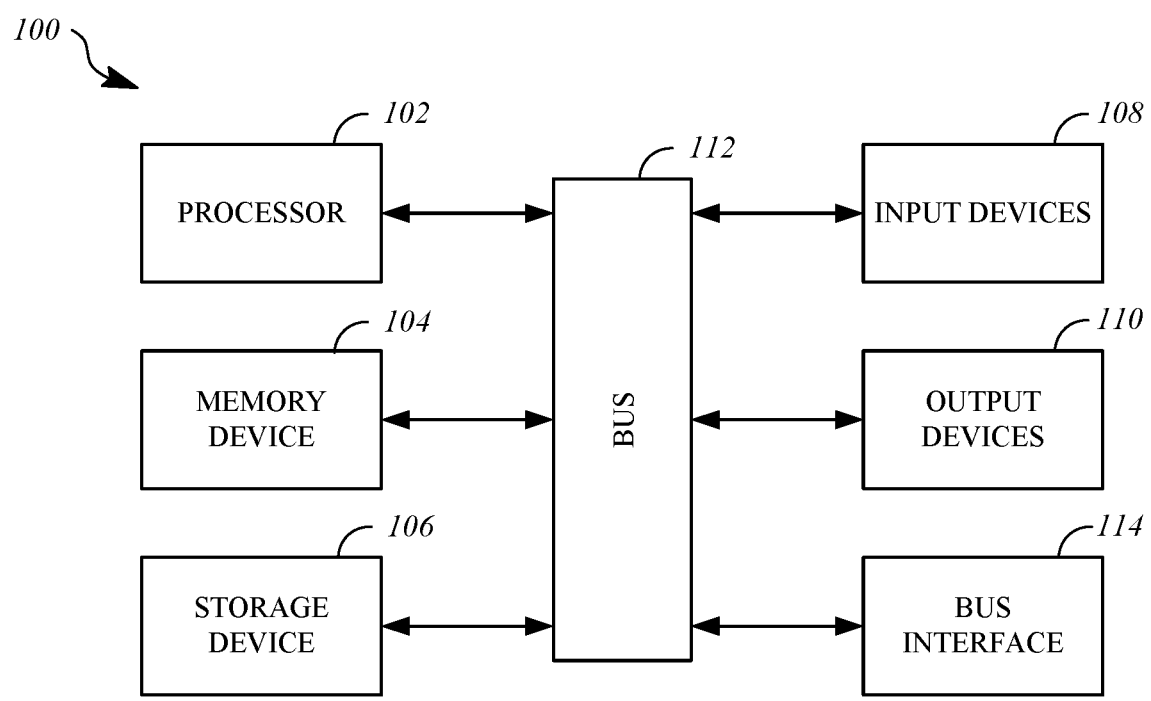
FIG. 1 is a block diagram showing an example of a computing device.

FIG. 1 shows an example of a controller 100 that can be utilized in the passive safety system described herein. The controller 100 can be a single computing device, housed, for example, in a vehicle head unit, or be a separate device such as a desktop computer, a laptop computer, a tablet, or a mobile telephone. Alternatively, the controller 100 can be a system that includes multiple computing devices working cooperatively.

In the illustrated example, the controller 100 includes a processor 102, a memory device 104, a storage device 106, one or more input devices 108, and one or more output devices 110, which are interconnected by a bus 112. The controller 100 can also include a bus interface 114 for connecting peripheral devices to the bus 112.

The processor 102 can be any type of device that is able to process or manipulate information, including devices that are currently known and devices that may be developed in the future. As an example, the processor 102 can be a conventional central processing unit (CPU). Although the illustrated example shows a single processor, multiple processors can be utilized instead of a single processor.

The memory device 104 is utilized to store information for immediate use by the processor 102. The memory device 104 includes either or both of a random access memory (RAM) device and a read only memory (ROM) device. The memory device 104 can be utilized to store information, such as program instructions that can be executed by the processor 102, and data that is stored by and retrieved by the processor 102. In addition, portions of the operating system of the controller 100 and other applications that are being executed by the controller 100 can be stored by the memory device during operation of the controller 100.

The storage device 106 is utilized to store large amounts of data persistently. As examples, the storage device 106 can be a hard disk drive or a solid state drive.

The input devices 108 can include any type of device that is operable to generate computer interpretable signals or data in response to user interaction with the controller 100, such as physical interaction, verbal interaction, or non-contacting gestural interaction. As examples, the input devices 108 can include one or more of a keyboard, a mouse, a touch-sensitive panel with or without an associated display, a trackball, a stylus, a microphone, a camera, or a three-dimensional motion capture device. The input devices 108 can also include any type of device that is operable to transfer computer interpretable signals or data to the controller 100, such as sensors or mobile devices.

The output devices 110 can include any type of device that is able to relay information in a manner that can be perceived by a user or utilized by another device. As examples, the output devices 110 can include one or more of an LCD display screen, an LED display screen, a CRT display screen, a printer, an audio output device such as a speaker, a haptic output device, a data port such as a USB or HDMI connector, etc. In some implementations, the output devices 110 include a display screen and the input devices 108 include a touch sensitive panel that is integrated into the display screen to define a touch-sensitive display screen.

The bus 112 can transfer signals and/or data between the components of the controller 100. Although depicted as a single bus, it should be understood that multiple or varying types of buses can be utilized to interconnect the components of the controller 100. The bus interface 114 can be any type of device that allows other devices, whether internal or external, to connect to the bus 112.

Figure 2:
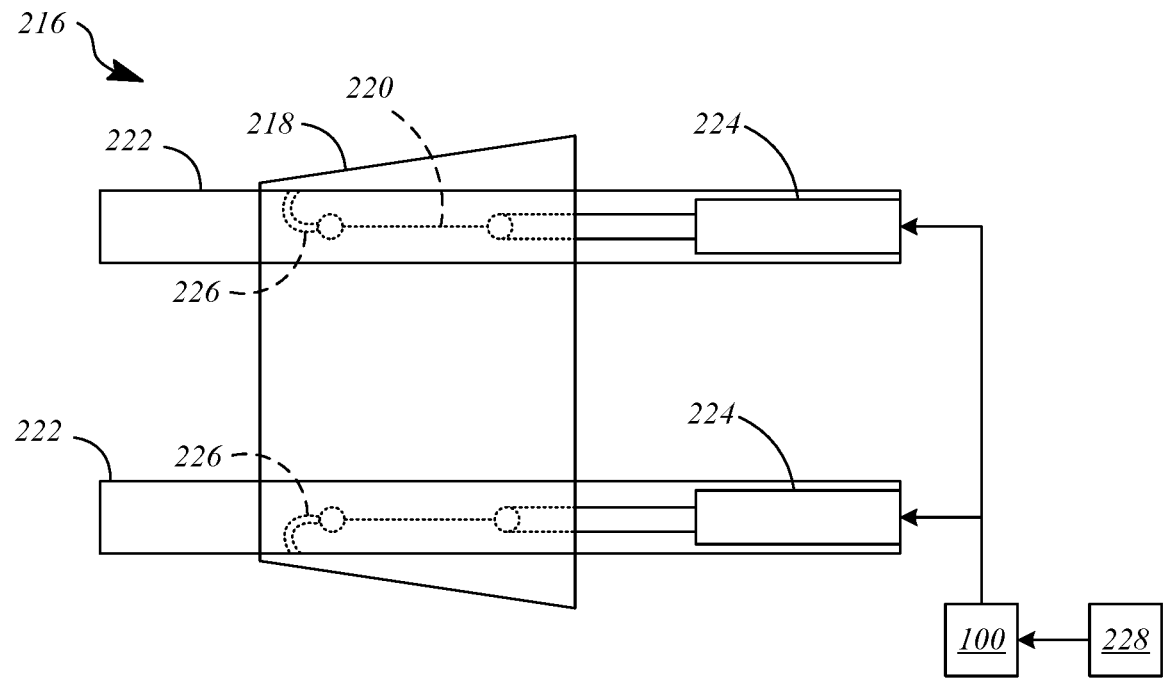
FIG. 2 is a top view of a passive safety system.

FIG. 2 shows a top view of a passive safety system 216 in a passenger vehicle. The proposed passive safety system 216 differs from existing passive safety systems in that it uses the motion of a seat 218 to provide deceleration of an occupant both before and during a vehicle collision.

Although the description herein is made with respect to single occupant seats, such as the seat 218, it should be understood that the systems described herein, such as the passive safety system 216, may be applied to other types of seats, such as bench seats.

The seat 218 can be rigidly mounted to a sliding carriage 220, which in turn is mounted to a seat support structure such as a pair of seat rails 222. In this example, the sliding carriage 220 can move longitudinally with respect to the vehicle along the seat rails 222. Other support structures designed to allow movement of the seat 218, for example, a seat base, are also possible.

Attached to the sliding carriage 220 and anchored within the seat rails 222 is a pair of motion control devices 224, which in this example are dampers. The motion control devices 224 may be rigidly or non-rigidly connected to the seat rails 222 and in engagement with or connected to the sliding carriage 220 in a manner that allows the motion control devices 224 to dampen, control, effect, or induce motion of the sliding carriage 220 with respect to the seat rails 222. In some embodiments, the motion control devices 224 induce acceleration of the sliding carriage 220 relative to the seat rails 222. When measured from a frame of reference outside the vehicle, the acceleration of the sliding carriage 220, the seat 218 and the occupant may be in the same direction as a vehicle acceleration (i.e. acceleration or deceleration of the vehicle), but may have a different magnitude due to control by the motion control devices. This difference allows the passive safety system 216 to control a maximum deceleration rate of the occupant to a lower deceleration rate than a maximum deceleration rate of the vehicle during the collision.

The motion control devices 224 can in some embodiments generate force on the sliding carriage 220 as a function of vehicle velocity or vehicle acceleration, which can in some cases have the effect of changing the motion (e.g., velocity, acceleration or deceleration) of the sliding carriage 220 and seat 218 mounted thereon. This force can be generated using hydraulic fluid, springs, dampers, shock absorbers, or any other means of exerting force against the sliding carriage 220. The amount of force generated by the motion control devices 224 can be controlled by a computing device or can be mechanically tuned based on deceleration forces experienced by the vehicle.

In one example, at very low speeds, the force exerted by the motion control devices 224 can be minimal, allowing the seat 218 to slide only according to the occupant's preference, for example, forward or rearward on the seat rails 222 to adjust the occupant's position in relation to a steering wheel, dashboard, airbag, or another occupant. In the event of a collision, the force exerted by the motion control devices 224 against the sliding carriage 220 can be larger, that is, a force sufficient to create a decelerating force that will reduce impact velocity of the occupant with, for example, a deployed airbag.

In some embodiments, the sliding carriage 220 can be held in place on the seat rails 222 by a release mechanism 226 that is controlled, for example, by the controller 100. The release 226 may be movable between a locked position, in which the release mechanism 226 restrains motion of the sliding carriage 220 relative to the seal rails 222, and an unlocked position, in which the release mechanism 226 permits motion of the sliding carriage 220 relative to the seal rails 222. The release mechanism 226 may be a simple latching mechanism that prevents the sliding carriage 220 from sliding in either one or both directions along the seat rails 222. The release mechanism 226 can be controlled by a relay, that, when de-energized, releases the sliding carriage 220 and allows the seat 218 to move along the seat rails 222. The controller 100 can control the relay based on input from, for example, sensors 228. In one embodiment, the sensors 228 may be or include pre-collision sensors that generate an output signal that indicates that a collision is imminent. In another embodiment, the sensors 228 may be or include acceleration sensors that generate an output signal that indicates a rate and/or direction of acceleration or deceleration of the vehicle. In one embodiment, the sensors 228 are part of an airbag system (not shown) and are used to activate the airbag system.

In another application (not shown), the release mechanism 226 can be integrated into the motion control devices 224. An electronically-controlled valve in the motion control devices 224 can be used to prevent the flow of hydraulic fluid, making the motion control devices 224 rigid elements. In the event of an anticipated collision, the controlled valve would be triggered to open (by the controller 100 based on input from sensors 228), and the seat 218 would be allowed to slide along the seat rails 222 in a controlled manner. In some designs, a pump could be used to control the flow of hydraulic fluid without the use of a valve.

In another application (not shown) where the release mechanism 226 is integrated into the motion control devices 224, the release mechanism 226 can include a hydraulic piston with magnetorheological (MR) fluid. In this example, an energized solenoid can be used to substantially increase the fluid viscosity around a valve orifice between piston chambers within the hydraulic piston. When the solenoid is energized, the hydraulic piston will block the motion of hydraulic fluid within the motion control devices 224, again making the motion control devices 224 into rigid elements and preventing the seat 218 from sliding along the seat rails 222. When the solenoid is de-energized (via command from the controller 100 based on input from sensors 228), the seat 218 is again free to move.

Figure 3:
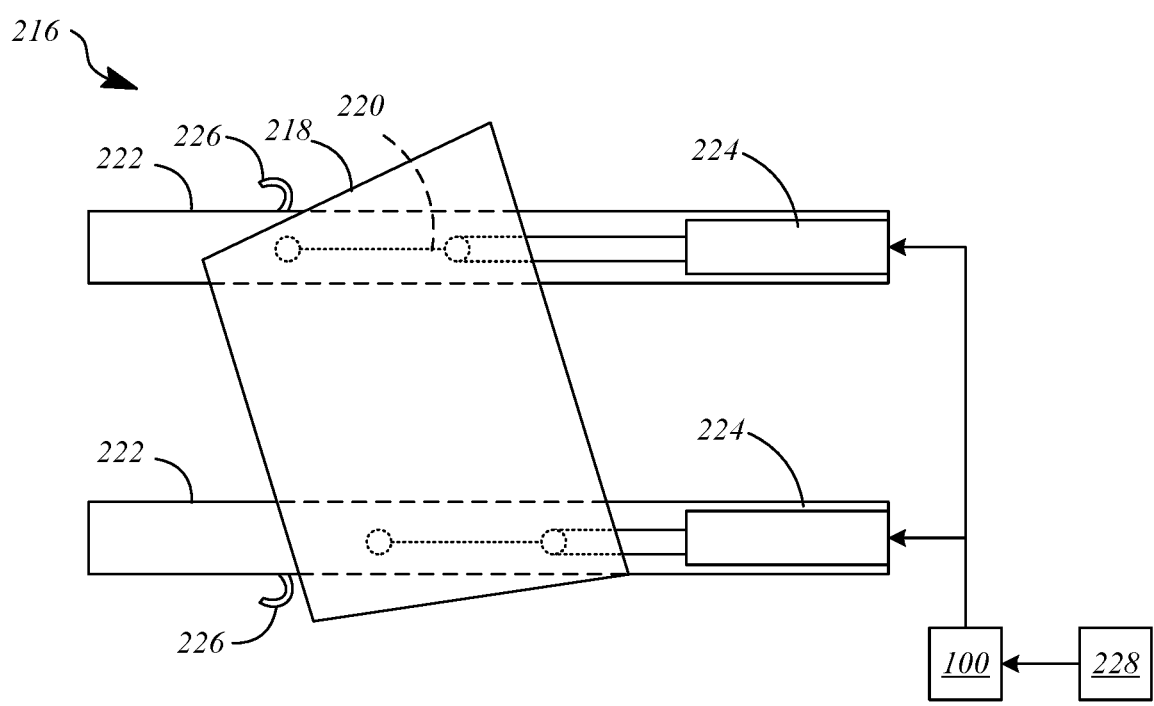
FIG. 3 is a top view of the passive safety system of FIG. 2 with the seat in a modified position.

FIG. 3 shows a top view of the passive safety system of FIG. 2 with the seat 218 in a modified position. In this example, the sliding carriage 220 includes means allowing rotation of the seat 218 prior to a collision, for example, when the sensors 228 detect that the collision will occur at a corner of the vehicle. In one example, rotation of the seat 218 can be accomplished using the motion control devices 224 once the release mechanism 226 is controlled to release the sliding carriage 220 from its locked position. Rotation can be accomplished by generating a different amount of force in each of the motion control devices 224 to rotate the sliding carriage 220 as shown.

In the case of a corner or glancing collision, rotating the seat 218 counter-clockwise from its traditionally straight position can allow both the safety restraint and the airbags to more efficiently decelerate the occupant based on the forces generated against the occupant by the collision. As an example, the seat 218 may be rotated in a direction that aligns the seat 218 with a direction in which external forces are expected to be applied to the vehicle during a collision based on information received from the sensors 228.

Rotation of the seat 218 can also be effected using means other than differing positions of the motion control devices 224 with respect to the sliding carriage 220. For example, the seat 218 can be anchored to the sliding carriage 220 on a bearing (not shown) that allows the seat 218 to rotate independently from the sliding carriage 220.

Figure 4:
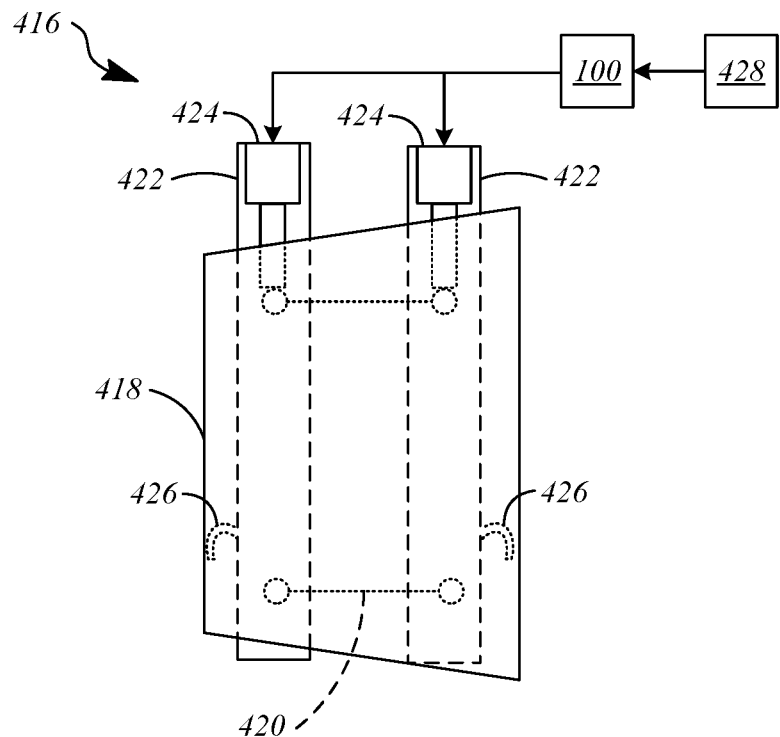
FIG. 4 is a top view of another passive safety system.

FIG. 4 shows a top view of another passive safety system 416. The passive safety system 416 includes a seat 418 that can be rigidly mounted to a sliding carriage 420, which in turn is mounted on a pair of seat rails 422. In this example, the sliding carriage 420 can move laterally with respect to the vehicle along the seat rails 422 for a limited distance, corresponding to a side-to-side motion within the vehicle in anticipation of a side collision. A pair of motion control devices 424 may be rigidly or non-rigidly connected to the seat rails 422 and in engagement with or connected to the sliding carriage 420 in a manner that allows the motion control devices 424 to dampen, control, effect, or induce motion of the sliding carriage 420 with respect to the seat rails 422. In some embodiments, the motion control devices 424 may be mounted within the seat rails 422. The motion control devices 424 are operable to apply force to the sliding carriage 420, for example, as a function of vehicle velocity or acceleration. In the event of a side collision, the force exerted by the motion control devices 424 against the sliding carriage 420 can reduce impact velocity of the occupant with, for example, a deployed airbag.

A release mechanism 426 with latching and unlatching capabilities is shown in an unlatched position, allowing the sliding carriage 420 to be repositioned within the seat rails 422 by the motion control devices 424. The controller 100 can control the release mechanism 426 based, for example, on input from sensors 428, which may be or include pre-collision sensors, or may be or include acceleration sensors. The passive safety system 416 of FIG. 4 can also be used in conjunction with the passive safety system 216 of FIGS. 2 and 3 to dampen the seat 218, 418 in both the longitudinal and lateral directions depending on the particular forces experienced during a collision. Though the passive safety systems 216, 416 show lateral and longitudinal motion capability using motion control devices 224, 424 fixed within perpendicular seat rails 222, 422, other motion control device and seat support structure configurations are possible.

Figure 5:
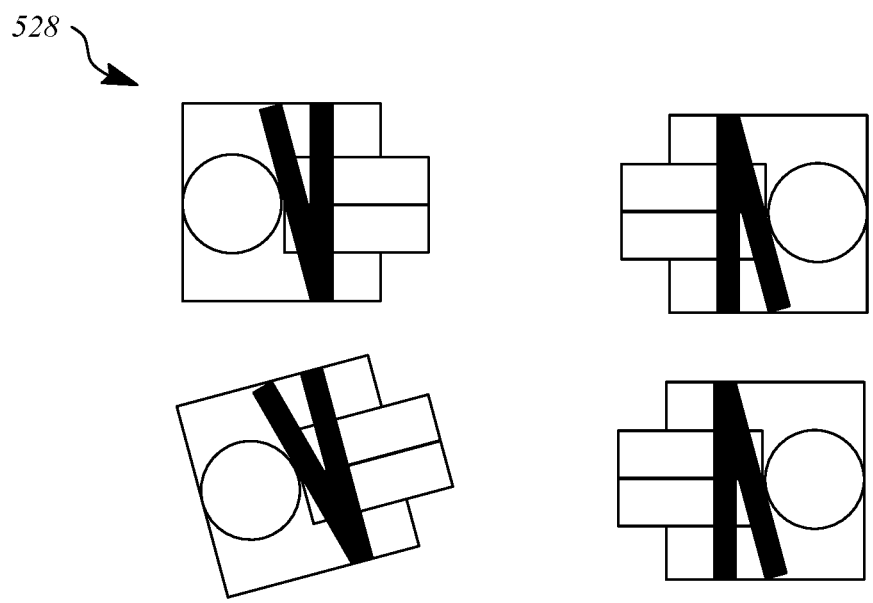
FIG. 5 is a top view of a passenger seating configuration in a vehicle.

FIG. 5 shows a passenger seating configuration 528 in a vehicle. In the passenger seating configuration 528, either one or more of the occupants has rotated a seat for comfort, or in the case of autonomous operation, to face other occupants within the vehicle as shown here in FIG. 5. In the passenger seating configuration 528, with front row seats that are rearward facing and back row seats that are forward facing, there may not be convenient locations in the vehicle where conventional airbags may be placed in order to decelerate the occupants of the back row seats.

In some embodiments, the passive safety systems 216, 416 of FIGS. 2-4 can be applied to seating configurations such as the passenger seating configuration 528 to decelerate the occupants in the event of a collision without using conventional airbags.

In some embodiments, the passive safety systems 216, 416 of FIGS. 2-4 can be applied to seating configurations such as the passenger seating configuration 528 to reposition one or more of the occupants to better align the occupant with the airbags prior to a collision. In this example, an autonomous vehicle can be configured to determine the current location of each seat and each occupant and rotate and/or move each seat to an optimized position based on the direction and/or magnitude of forces expected in the impending collision. Rotation or other repositioning of the seats can be used in addition to the below described features of the passive safety systems 216, 416 of FIGS. 2-4.

Figure 6:
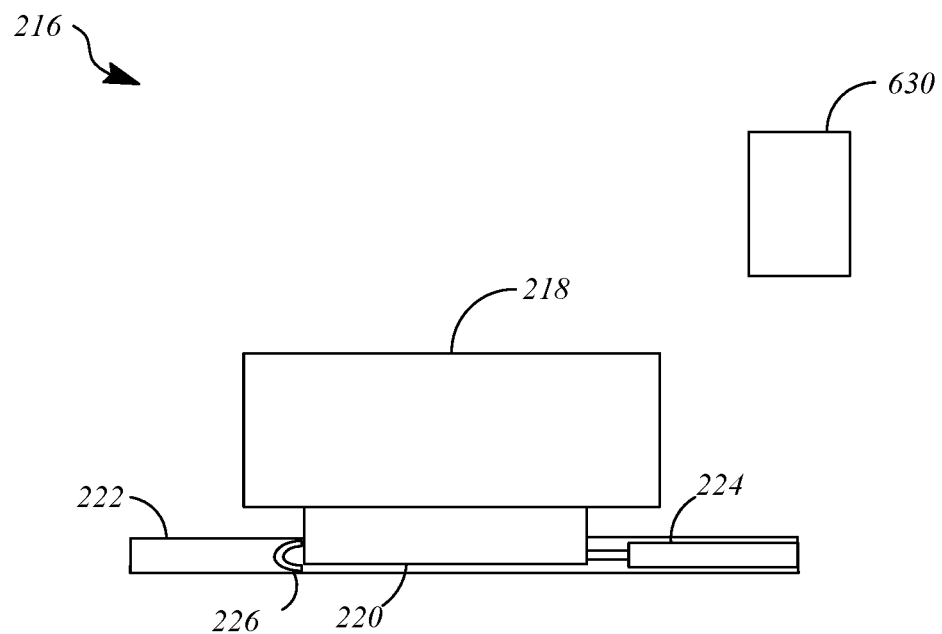
FIG. 6 is a side view of the passive safety system of FIGS. 1-2.

FIG. 6 shows a side view of the passive safety system 216 of FIGS. 2 and 3. As described above, the seat 218 is typically anchored in position with respect to the vehicle, for example, using the frame or sliding carriage 220 disposed within a set of seat rails 222 that allow movement of the seat 218 both forward and rearward in a traditional manner to allow the occupant to position the seat 218 comfortably. A specific spacing or fore-aft position can established between the seat 218 and a vehicle structure 630 once the sliding carriage 220 is locked in position within the seat rails 222. As one example, vehicle structure 630 may be a steering wheel when the occupant is the driver of the vehicle. As another example, the vehicle structure 630 may be an airbag. As another example, the vehicle structure 630 may be a dashboard. To move the seat 218 along the seat rails 222, the release mechanism 226 must be triggered to unlock the sliding carriage 220 from its position within the seat rails 222.

Figure 7:
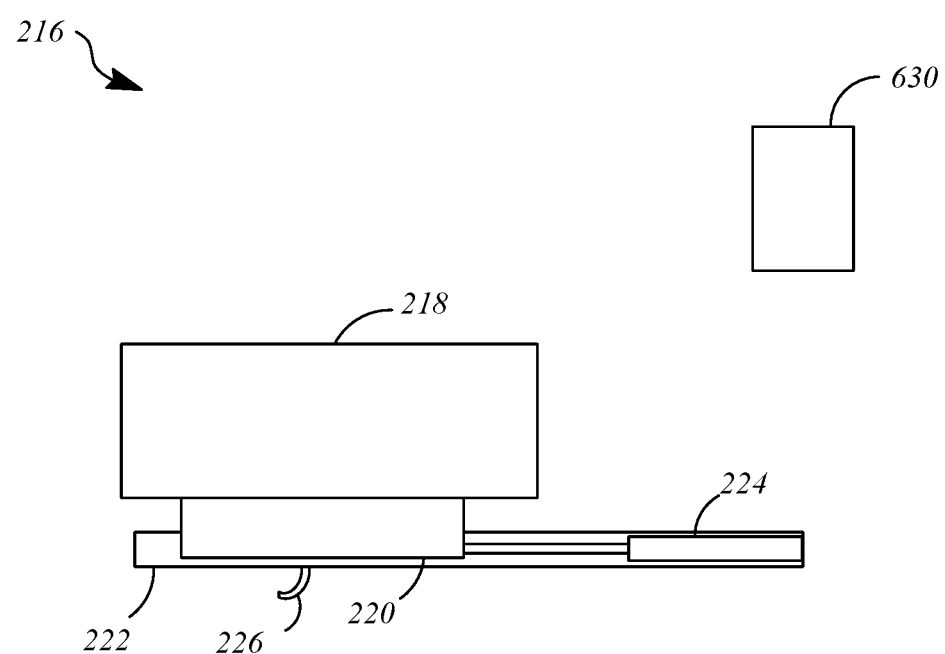
FIG. 7 is a side view of the passive safety system of FIGS. 1-2 with the seat in another modified position.

FIG. 7 shows a side view of the passive safety system 216 of FIGS. 2 and 3 with the seat 218 in another modified position. In comparison to the position of the seat 218 in FIG. 6, the position of the seat 218 in FIG. 7 is such that the seat 218 has moved rearward along the seat rails 222 to a determined position in anticipation of a front-end collision. The determined position may be determined by the controller 100 based on, for example, the position of the vehicle structure 630 relative to the seat 218. Once the sensors 228 detect that a front-end collision is imminent, the release mechanism 226 can be triggered as shown and, based on vehicle parameters such as space constraints within the vehicle cabin, location of occupants within the vehicle (driver, front occupant, or rear occupant), mode of operation (autonomous versus manual), and occupant control capability, the seat 218 can be moved rearward by the motion control devices 224 to increase the distance between the occupant and the vehicle structure 630.

Adding travel distance along the seat rails 222 gives the passive safety system 216 additional time to smoothly decelerate the occupant during a collision. This passive safety system feature is useful for autonomous operation of the vehicle or for occupants that do not require a specific position of the seat 218 in order to interact with the vehicle. Increasing the distance between the seat 218 and the vehicle structure 630 prior to collision may not be feasible during manual operation of the vehicle by a driver when the vehicle structure 630 is a steering wheel, given the need for a driver to effectively grasp the steering wheel, or when back row occupants are present in close proximity to front row occupants.

During the collision, or as soon as the vehicle starts to decelerate in anticipation of the collision, the seat 218 and hence the occupant within the seat 218 can be decelerated using the motion control devices 224 to cause or change the motion of the sliding carriage 220 along the seat rails 222. The controller 100 may control deceleration of the occupant by determining a motion control command that controls operation of the motion control devices 224 according to one or more parameters, as will be explained herein, in order to exert a determined force upon the sliding carriage 220, or in order to cause a determined acceleration of the sliding carriage relative to the seat rails 222. For the pump, adjustable valve, and MR-fluid piston examples allowing control of the motion control devices 224, the amount of deceleration provided by the motion control devices 224 can be modified by adjusting the pump rate, valve position, and the solenoid current, respectively.

For example, the force or acceleration applied to the sliding carriage 220 in response to the motion control command can be based on in-vehicle parameters such as the position of occupants within the vehicle and the distance between the seat 218 and the vehicle structure 630. When longer distances of travel are possible for the seat 218 along the seat rails 222 prior to airbag deployment, the damping coefficient can be decreased whereas at shorter distances of travel, the damping coefficient can be increased to provide higher deceleration force.

The force or acceleration applied to the sliding carriage 220 in response to the motion control command can also be based on collision parameters such as the type or severity of the collision and the size and speed of the vehicles or objects subject to the collision. At higher pre-collision vehicle velocities, the damping coefficient can be increased to provide higher deceleration force whereas at lower pre-collision vehicle velocities, the damping coefficient can be reduced to provide a lower deceleration force. The damping coefficient can also be modified during the collision based on actual forces experienced by the vehicle versus the anticipated forces (and direction of those forces) calculated using the sensors 428.

Finally, force or acceleration applied to the sliding carriage 220 in response to the motion control command can also be tailored to the physical characteristics of the occupant within the seat 218. Physical characteristics or occupant parameters that control the damping coefficient can include occupant height, weight, and age (e.g., senior citizen, adult, or child). For example, for larger occupants, the damping coefficient can be increased whereas for smaller occupants, the damping coefficient can be decreased.

Figure 8:
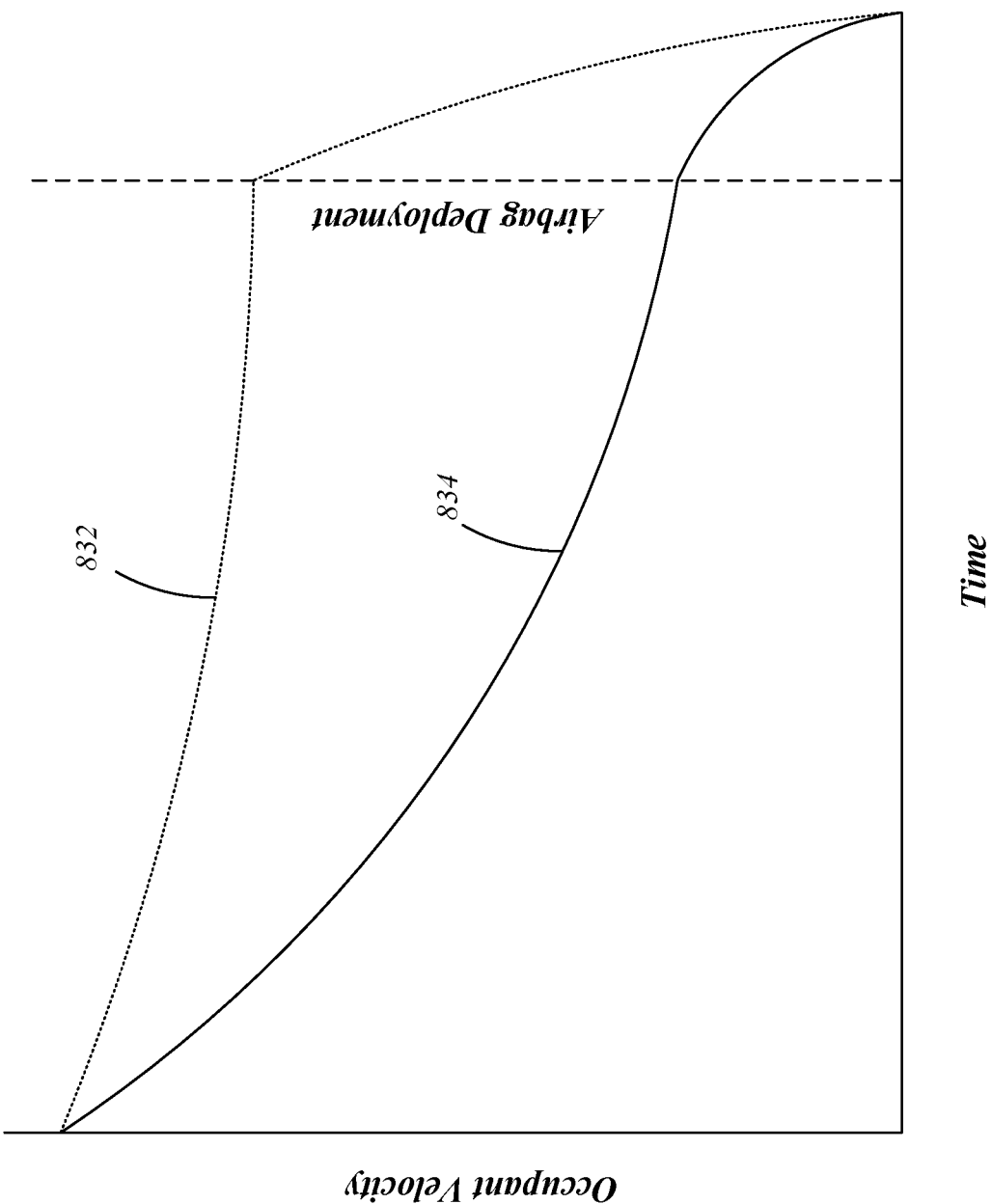
FIG. 8 is a graph showing occupant velocity versus time based on use of a traditional passive safety system and use of the exemplary passive safety systems of FIGS. 2-7.

FIG. 8 shows a graph showing occupant velocity versus time based on use of a traditional passive safety system and use of the exemplary passive safety systems 216, 416 of FIGS. 2-7. Curve 832 represents occupant velocity both pre-collision and during collision for a traditional passive safety system, that is, when the seat 218 is fixed in position with respect to an airbag deployed during the collision. The occupant velocity reduces very slowly at first and then quite rapidly after the airbag deploys. The forces experienced by the occupant are high, and the risk for injury is also high.

Curve 834 represents occupant velocity when the improved passive safety systems 216, 416 described above are implemented. Since the deceleration of the occupant begins earlier, based on the damping force provided by the motion control devices 224, the force imparted by the airbag to the occupant can be lowered as a consequence of the occupant's deceleration and (in some cases) by controlling the deployment timing, deployment force, or other parameters of the airbag's operation. Further, since the seat 218 and occupant are being decelerated together, the force exerted by the seat restraint is also reduced.

What is claimed is:

1. A passive safety system, comprising:
   a seat support structure;
   a seat that is connected to the seat support structure such that the seat is translatable within the seat support structure and rotatable about an axis that extends upwardly relative to a seating surface;
   a motion control device operable to apply a force to translate and rotate the seat relative to the seat support structure prior to an imminent collision;
   a sensor that provides an output signal indicative of the imminent collision; and
   a controller that causes the motion control device to:
      apply the force to translate the seat relative to the seat support structure prior to the imminent collision in response to the output signal such that a distance between the seat and a vehicle structure is increased; and
      apply the force to rotate the seat about the axis prior to the imminent collision in response to the output signal such that the seat is aligned with the vehicle structure and facing a direction in which external forces are expected to be applied to the vehicle during the imminent collision.

2. The passive safety system of claim 1, further comprising:
a release mechanism that is movable between a locked position, in which the release mechanism restrains motion of the seat relative to the seat support structure, and an unlocked position, in which the release mechanism permits motion of the seat relative to the seat support structure, wherein the controller causes the release mechanism to move from the locked position to the unlocked position in response to the output signal.

3. The passive safety system of claim 1, wherein the controller causes the motion control device to move the seat using a motion control command that is based on at least one of vehicle parameters, occupant parameters, and collision parameters.

4. The passive safety system of claim 1, wherein the controller causes the motion control device to move the seat using a motion control command that is based on the distance between the seat and the vehicle structure.

5. The passive safety system of claim 1, wherein the controller causes the motion control device to move the seat to a determined position relative to the seat support structure.

6. The passive safety system of claim 1, wherein the controller causes the motion control device to move the seat at a determined acceleration relative to the seat support structure.

7. The passive safety system of claim 1, wherein the controller causes the motion control device to move the seat to control a deceleration experienced by an occupant during the collision.

8. The passive safety system of claim 1, wherein the controller causes two motion control devices to rotate the seat using generation of a different amount of force by each of the motion control devices in response to the output signal.

9. A passive safety system, comprising:
a seat;
a structure for supporting the seat, wherein the seat is movable with respect to the structure;
a motion control device connected to the structure, wherein the motion control device is operable to apply a force to the seat to decelerate the seat during translation of the seat in respect to the structure prior to an imminent collision and to rotate the seat in respect to the structure to align the seat to face one or more airbags prior to the imminent collision;
a sensor that provides an output signal, wherein the output signal indicates an imminent collision and a vehicle deceleration prior to the imminent collision; and
a controller that controls the force applied to the seat by the motion control device based on the output signal such that the motion control device imparts a decelerating force to the seat that reduces a velocity of an occupant in the seat prior to deployment of the one or more airbags, lowering a force imparted by the one or more airbags to the occupant after deployment.

10. The passive safety system of claim 9, further comprising:
a release mechanism, wherein the controller causes the release mechanism to restrain or permit motion of the seat relative to the structure based on the vehicle deceleration.

11. The passive safety system of claim 9, wherein the controller controls the force applied to the seat by the motion control device based on at least one of vehicle parameters, occupant parameters, and collision parameters.

12. The passive safety system of claim 9, wherein the controller controls the force applied to the seat by the motion control device based on a distance between the seat and a vehicle structure.

13. The passive safety system of claim 9, wherein the controller controls the force applied to the seat by the motion control device to move the seat to a determined position relative to the structure.

14. The passive safety system of claim 9, wherein the controller controls the force applied to the seat by the motion control device to cause a determined acceleration of the seat relative to the structure.

15. The passive safety system of claim 9, wherein the controller controls the force applied to the seat by the motion control device to rotate the seat based on the output signal.

16. A passive safety system, comprising:
a seat support structure;
a seat that is connected to the seat support structure and is movable relative to the seat support structure;
a damper that controls motion of the seat to move the seat relative to the seat support structure prior to an imminent collision in a direction aligned with and away from an undeployed airbag of a vehicle and opposite an anticipated direction of deceleration of an occupant in the seat and of deceleration of the vehicle resulting from the imminent collision, wherein a deceleration rate of the occupant and the seat is lower than a deceleration rate of the vehicle prior to the imminent collision based on a force exerted by the damper against the seat prior to the imminent collision;
a release mechanism that is movable between a locked position, in which the release mechanism restrains motion of the seat relative to the seat support structure, and an unlocked position, in which the release mechanism permits motion of the seat relative to the seat support structure;
a sensor that provides an ouput signal indicative of the imminent collision; and
a controller that causes movement of the release mechanism between the locked position and the unlocked position prior to the imminent collision and in response to the output signal.

17. The passive safety system of claim 16, wherein the output signal is indicative of vehicle deceleration.

* * * * *